(12) United States Patent
Van Zee et al.

(10) Patent No.: US 9,517,891 B1
(45) Date of Patent: Dec. 13, 2016

(54) CONVEYOR BELT IDLER SYSTEMS

(71) Applicant: Precision, Inc., Pella, IA (US)

(72) Inventors: Anthony Van Zee, Pella, IA (US); James Masek, Otley, IA (US)

(73) Assignee: Precision, Inc., Pella, IA (US)

( * ) Notice: Subject to any disclaimer, the term of this patent is extended or adjusted under 35 U.S.C. 154(b) by 0 days.

(21) Appl. No.: 14/876,327

(22) Filed: Oct. 6, 2015

(51) Int. Cl.
*B65G 39/12* (2006.01)
*B65G 15/60* (2006.01)
*B65G 15/40* (2006.01)
*B65G 15/08* (2006.01)

(52) U.S. Cl.
CPC ............... *B65G 39/12* (2013.01); *B65G 15/08* (2013.01); *B65G 15/40* (2013.01); *B65G 15/60* (2013.01)

(58) Field of Classification Search
CPC ......... B65G 15/08; B65G 15/40; B65G 15/60; B65G 39/12; B65G 39/125
USPC ........................................ 198/825, 826, 830
See application file for complete search history.

(56) References Cited

U.S. PATENT DOCUMENTS

| | | | | |
|---|---|---|---|---|
| 2,427,590 A * | 9/1947 | Conners | ............... | B65G 39/125 198/826 |
| 2,818,966 A * | 1/1958 | Gill | ...................... | B65G 39/125 198/826 |
| 3,147,851 A * | 9/1964 | Dietrich | .................. | B65G 15/42 198/703 |
| 3,259,227 A | 7/1966 | Steinmetz | | |
| 3,603,449 A * | 9/1971 | Snow, III | ............... | B65G 29/00 198/498 |
| 5,103,967 A | 4/1992 | Stoll | | |
| 5,341,920 A * | 8/1994 | Riffe | ...................... | B65G 39/12 198/825 |
| 2016/0114978 A1* | 4/2016 | Swinderman | ........... | B65G 15/08 198/562 |

FOREIGN PATENT DOCUMENTS

| | | |
|---|---|---|
| CA | 2064306 | 10/1992 |
| CN | 204280590 U | 4/2015 |

* cited by examiner

*Primary Examiner* — Gene Crawford
*Assistant Examiner* — Keith R Campbell
(74) *Attorney, Agent, or Firm* — Armstrong Teasdale LLP

(57) ABSTRACT

Belt conveyor idler systems for increasing the trough angle of a conveyor belt are disclosed. In some embodiments, wing roll brackets that support the wing rolls increase in length from the front end to the back end of the idler system.

23 Claims, 12 Drawing Sheets

CONVEYOR BELT IDLER SYSTEMS

FIELD OF THE DISCLOSURE

The field of the disclosure relates to idler systems for conveyor belts and, in particular, idler systems for increasing the trough angle of a conveyor belt.

BACKGROUND

During mining and other bulk transport operations, material must be transported over long distances in order to load the material by truck or rail. Further, such material must be unloaded and transported for processing. Among the common means for transport are bulk conveyors which are capable of transporting large amounts of material quickly and reliably and without significant cost. Typical conveyors that may be employed include drag, screw, belt and pneumatic conveyors.

Belt conveyors are well suited for use in many transport applications and are particularly well suited for use in mining operations. Belt conveying systems include at least two pulleys and a conveyor belt which rotates about the two pulleys. Material is loaded onto the belt at a tail section and is unloaded via gravity at a head section. A tail pulley and head pulley allow the belt to travel from the point at which material is loaded to the point it is unloaded and back again. The conveying system may also include take-up pulleys to provide proper belt tensioning, bend pulleys to change the direction of travel of the belt and snub pulleys, typically located adjacent the drive pulley, to increase the contact with the drive pulley and/or provide belt tensioning. The belt may be driven at a number of positions including the tail section or head section of the conveyor system.

As the belt travels over the tail pulley in the tail section for loading of bulk material, the profile of the belt changes from a flat profile to a troughed profile in which the sides of the belt are raised to capture bulk material within the belt. Changing the profile of the belt creates stress along the belt. To reduce stress, the profile of the belt is changed incrementally from the tail pulley by use of several transition idlers.

A need exists for idler systems that increase the trough angle of the conveyor belt over relatively short distances without creating undue stress on the conveyor belt.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to an idler system for increasing the trough angle of a conveyor belt. The idler system includes at least three conveyor belt idlers for supporting the conveyor belt. The system has a front end and a back end and a central axis that extends through the conveyor belt idlers from the front end to the back end. Each conveyor belt idler includes a first wing roll and a second wing roll with both wing rolls having an outer end and an inner end. A center roll is between the first wing roll and the second wing roll. The first wing roll and second wing roll are angled downward toward the center roll. The first and second wing rolls and center roll each have an axis of rotation. The axis of rotation of the first and second wing rolls is offset from the axis of rotation of the center roll along the central axis. Each idler includes a frame for supporting the first wing roll, second wing roll and center roll. A first outer bracket is connected to the frame and to the first wing roll at its outer end. There is a vertical distance from the frame to the connection between the first wing roll and the first outer bracket. A second outer bracket is connected to the frame and the second wing roll at its outer end. There is a vertical distance from the frame to the connection between the second wing roll and the second outer bracket. The vertical distance from the frame to the connection between the first wing roll and the first outer bracket and the vertical distance from the frame to the connection between the second wing roll and the second outer bracket increases from the front end of the system to the back end of the system.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
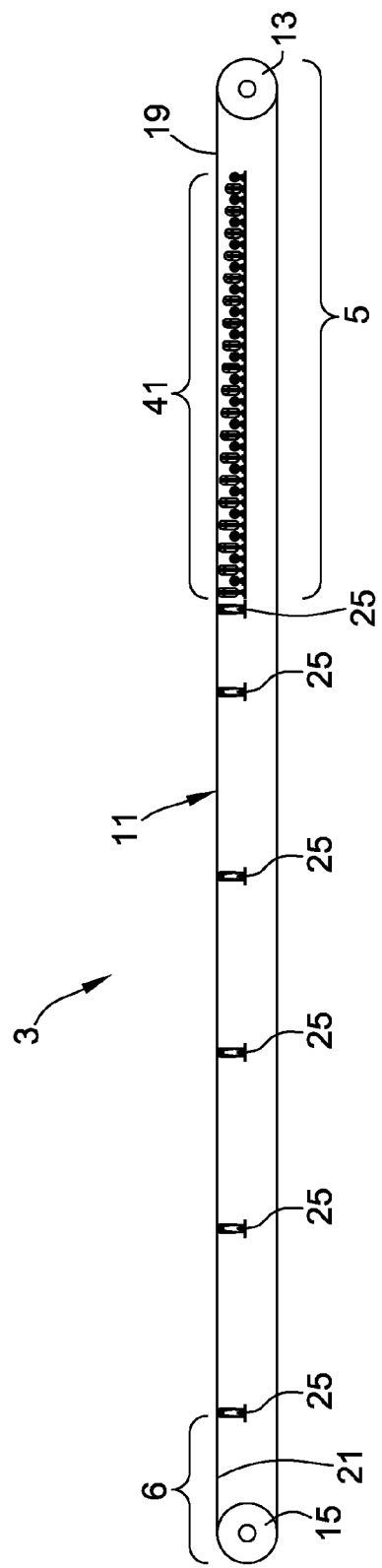
FIG. 1 is a schematic of a belt conveyor system.

Referring now to FIG. 1, a belt conveyor system 3 for transporting bulk materials is shown schematically. The conveyor system 3 has a tail section 5 at which bulk material is loaded and a head section 6 at which bulk material is discharged, typically by force of gravity. The conveyor system 3 includes a conveyor belt 11 which supports the bulk material and which rotates around a tail pulley 13 and a head pulley 15. The bulk material is supported on an outer surface 19 of the conveyor belt 11. An inner surface 21 of the conveyor belt 11 contacts the tail pulley 13 and the head pulley 15. The head pulley 15 may drive the conveyor belt system 3 (e.g., motor rotation); however, it should be understood that alternatively the tail pulley 13 may drive the system. Further in this regard, the conveyor system 3 may contain pulleys other than as shown (e.g., snub pulleys, bend pulleys, take-up pulleys and the like) which may optionally drive the belt system. It should also be understood that the conveyor system 3 is shown for illustration and is not drawn to scale.

Figure 2:
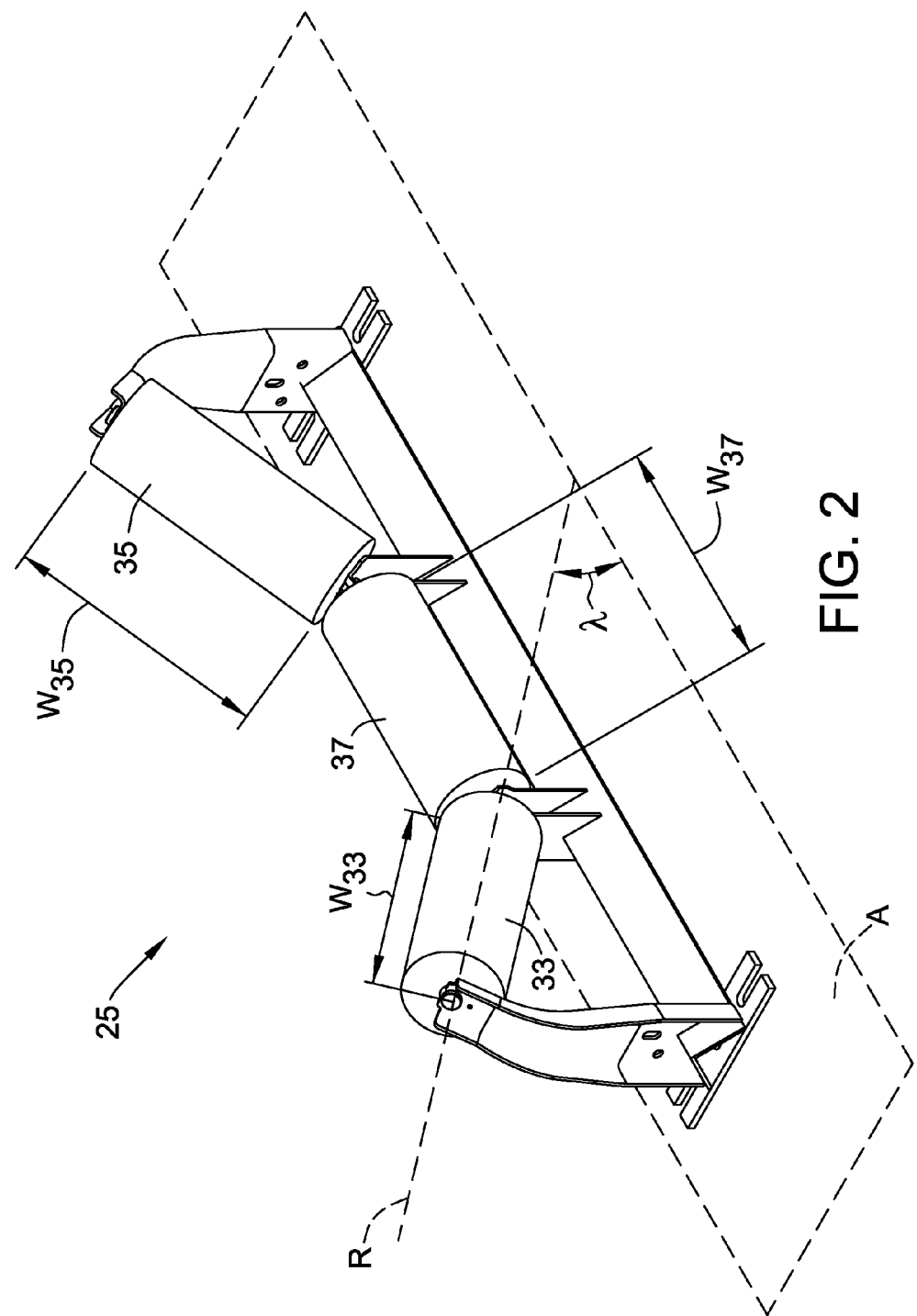
FIG. 2 is a perspective view of a troughing idler.

The belt conveyor system 3 includes troughing idlers 25 that support the belt 11 and bulk material (not shown) carried on the outer surface 19 of the belt 11. The troughing idlers 25 create a troughed conveyor belt profile to capture and carry the bulk material within the belt. With reference to FIG. 2, the troughing idlers 25 include a first wing roll 33, a second wing roll 35 and a center roll 37 between the first and second wing rolls 33, 35. As typical of troughing idlers, the widths $W_{37}$ of the center roll 35 is substantially the same as the widths $W_{33}$, $W_{35}$ of the first and second wing rolls 33, 35 (i.e., each of $W_{33}$, $W_{35}$, $W_{37}$ is substantially the same).

The troughing idlers 25 (which may be referred to herein as a "system" of troughing idlers) transports the bulk material from the tail section 5 to the head section 6 of the conveyor belt system 3. The troughing idlers 25 are generally between the transition idler system 41 described below and the head pulley 15.

A horizontal plane A of the troughing idler 25 and the rotational axis R of each wing roll 33, 37 form a trough angle λ. The trough angle λ may be chosen based on the type of bulk material transported with typical trough angles ranging from about 20° to about 45°. Generally, the trough angles λ of each of the troughing idlers 25 within the belt conveyor system 3 are the same throughout the system 3.

The belt conveyor system 3 (FIG. 1) includes an idler system 41 for transitioning the belt 11 from a flat profile at the tail pulley 13 to a troughing profile at the first troughing idler 25. The idler system 41 includes a plurality of conveyor belt idlers 45 (FIG. 3) for supporting the conveyor belt and adjusting the conveyor belt profile. The system 41 has a front end 51 and a back end 55 and a central axis B that extends through the conveyor belt idlers 45 from the front end 51 to the back end 55.

Figure 4:
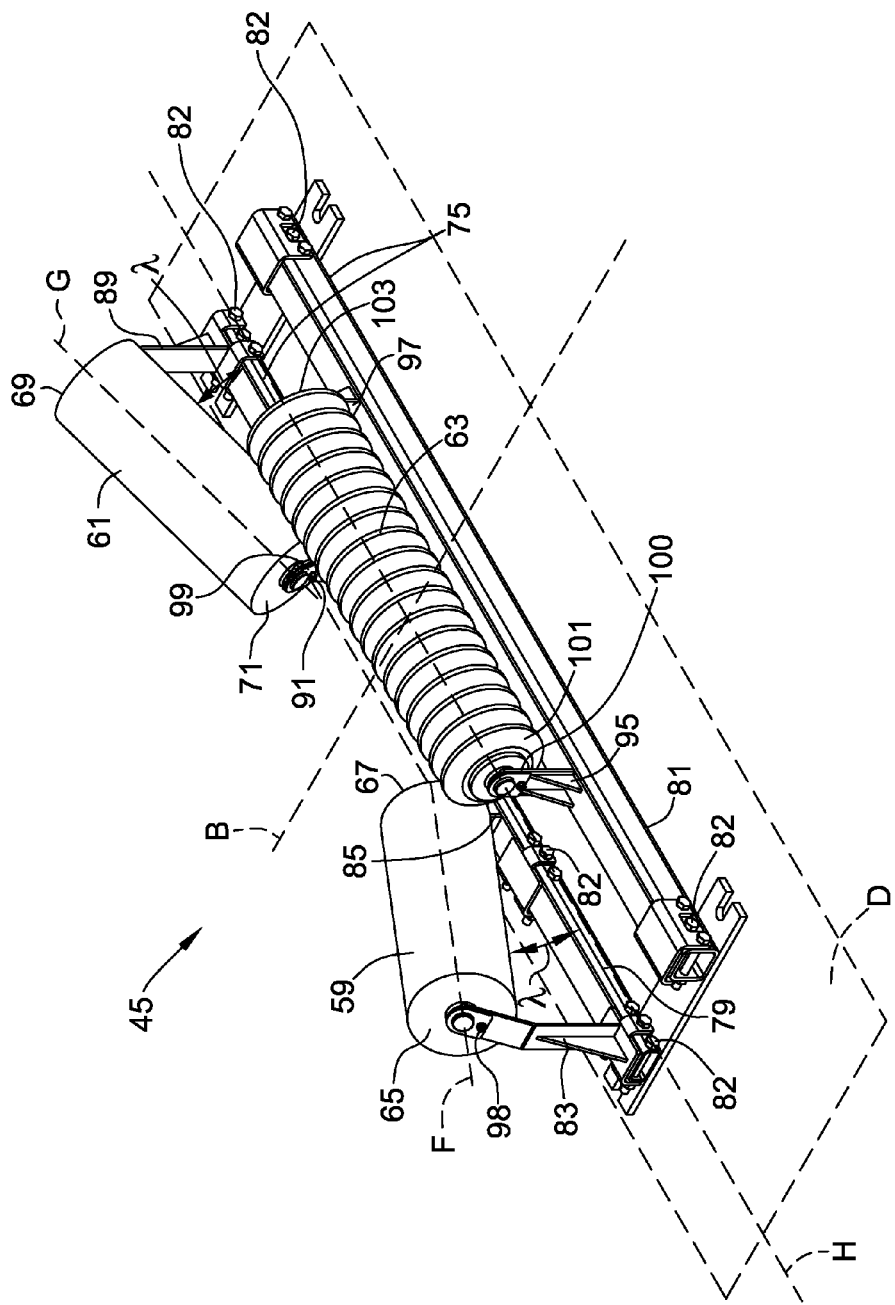
FIG. 4 is s perspective view of a transition idler of the system of FIG. 3.

With reference to FIG. 4, each idler 45 includes a first wing roll 59, a second wing roll 61 and a center roll 63 between the first wing roll 59 and the second wing roll 61. The first wing roll 59 has an axis of rotation F about which the roll 59 rotates. The second wing roll 61 has an axis of rotation G about which the roll 61 rotates. The center roll 63 also has an axis of rotation H about which the roll 63 rotates. The axis of rotation H of the center roll 63 is parallel to the horizontal plane D of the idler system. The axis of rotation F, G, H of each roll 59, 61, 63 is perpendicular to the central axis B of the idler system.

Generally, each idler 45 of the transition idler system includes three rolls (i.e., first and second wing rolls 59, 61 and center roll 63). In other embodiments, the center roll 63 is segmented into two or more sectional rolls (not shown) that have a common axis of rotation H (e.g., two, three, four or five sectional rolls). Such sectional rolls may have the same width or the widths of the sectional rolls may vary. As used herein, reference to a "center roll" includes embodiments in which the center roll is segmented into sectional rolls. Further, in embodiments in which the idler includes sectional center rolls, reference herein to the width of the center roll includes the sum of the widths of each sectional roll.

Each roll 59, 61, 63 rotates about a shaft that extends through the roll. Two bearings (e.g., ball bearings) are located at each end of the roll to allow the roll to rotate about the shaft. Each roll 59, 61, 63 may be metal or may include a polymer material (e.g., styrene-butadiene rubber, neoprene or urethane) covering a metal shell. In the illustrated embodiment, the center roll 63 is a grooved impact roll (e.g. rubber disk roll) and the wing rolls 59, 61 are metal rolls. In other embodiments, all three rolls 59, 61, 63 are impact rolls or all three rolls 59, 61, 63 are metal rolls.

Figure 3:
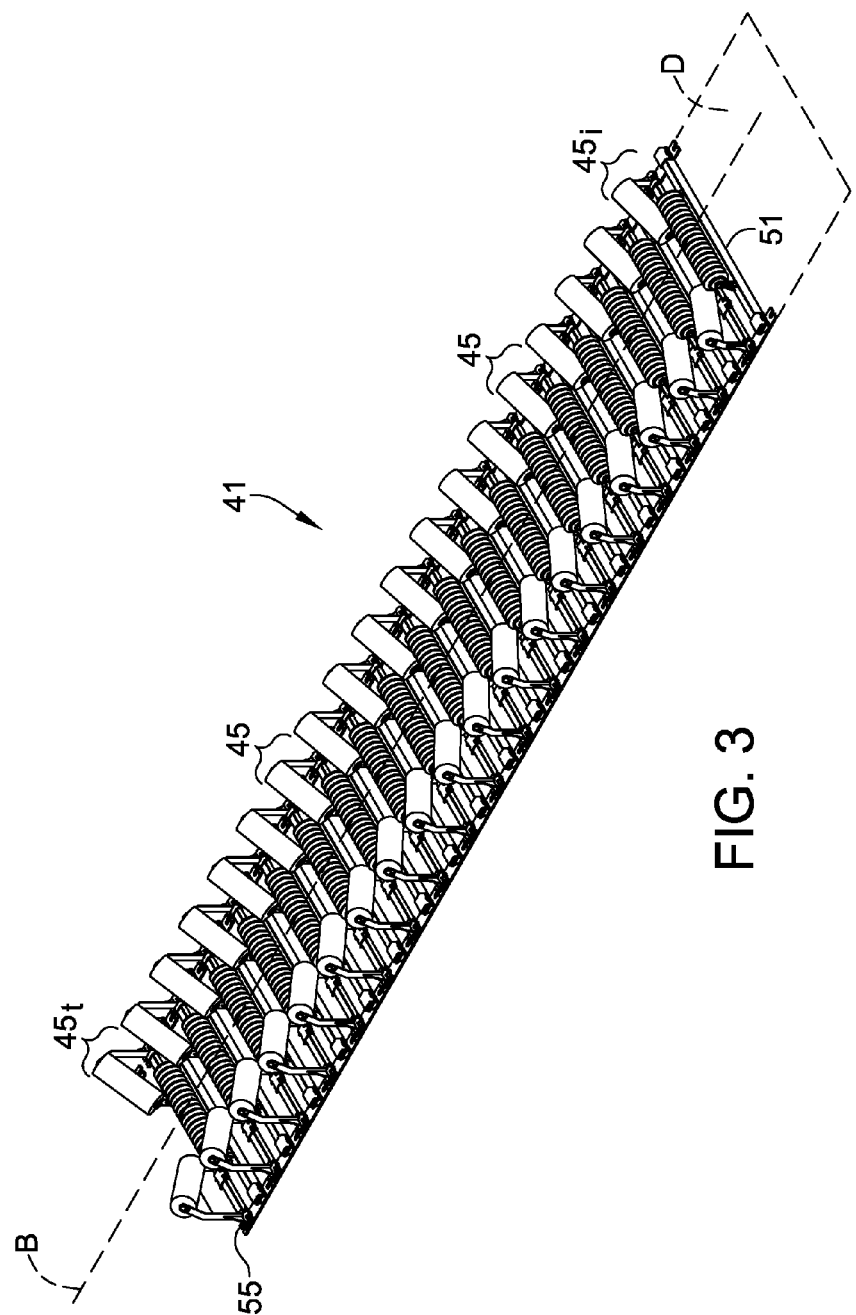
FIG. 3 is a perspective view of a transition idler system.

In the illustrated embodiment, the idler system 41 includes 19 transition idlers 45 (FIG. 3). The system 41 may include more or less idlers 45 (e.g., at least about 3, at least about 5, at least about 10 or at least about 15 idlers).

A horizontal plane D extends through the system 41 (FIG. 3) and each idler 45 (FIG. 4). The axes of rotation F, G of the first and second wing rolls 59, 61 each form an angle λ with the horizontal plane D. The center roll 63 is parallel to the horizontal plane D and the first and second wing rolls 59, 61 are angled with respect to the center roll 63.

Figure 7:
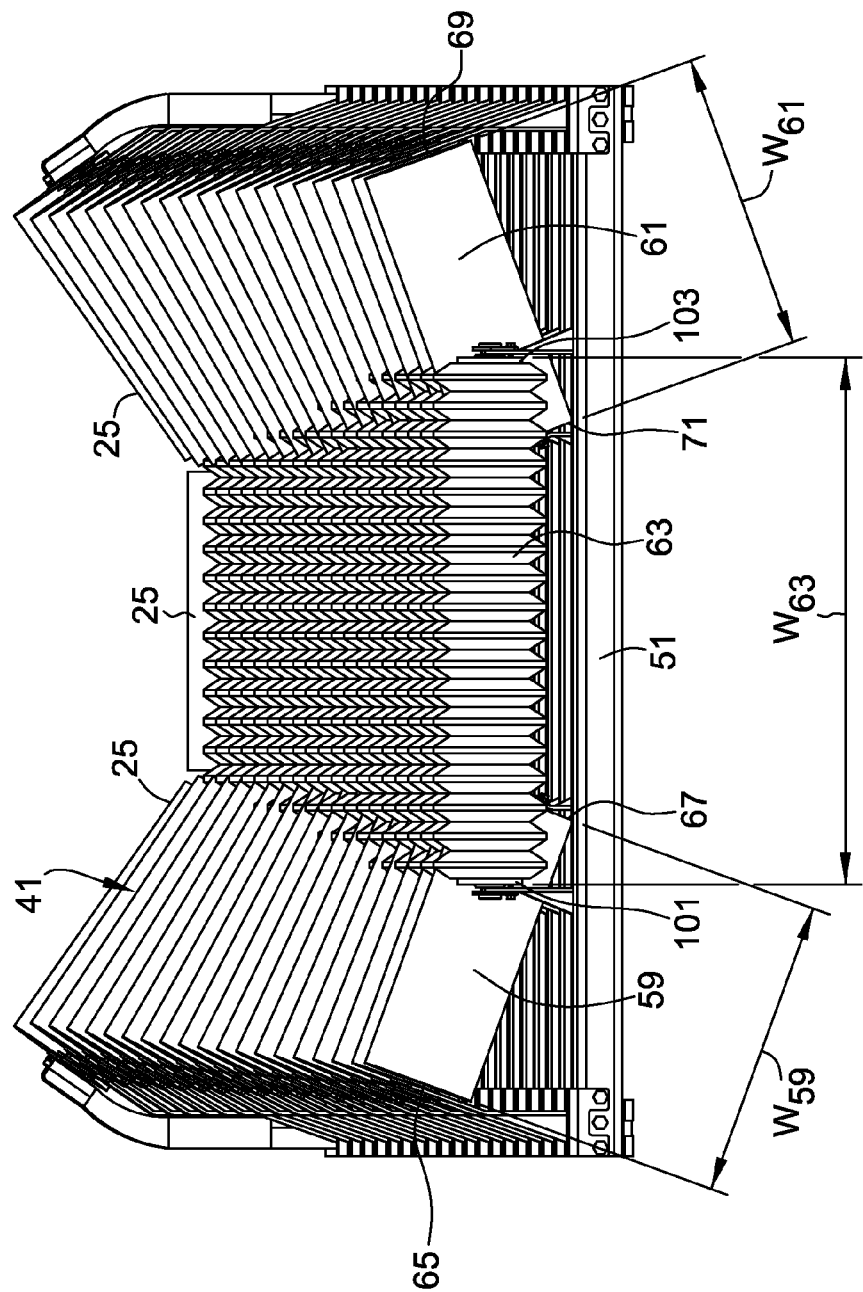
FIG. 7 is a perspective view of the transition idler system and a troughing idler.

The first wing roll 59 has an outer end 65 and an inner end 67 and the second wing roll 61 also has an outer end 69 and an inner end 71. The first wing roll 59 has a width $W_{59}$ (FIG. 7) that extends from its outer end 65 to its inner end 67. The second wing roll 61 has a width $W_{61}$ that extends from its outer end 69 to its inner end 71. The center roll 63 includes first and second ends 101, 103 and has a width $W_{63}$ that extends from its first end 101 to its second end 103.

Generally, the width $W_{59}$ of the first wing roll 59 and the width $W_{61}$ of the second wing roll 61 of an idler 45 are the same. The width $W_{63}$ of the center roll 63 is greater than the width $W_{59}$ of the first wing roll 59 and the width $W_{61}$ of the second wing roll 61 in each idler 45 (i.e., the idlers 45 are "picking" idlers and may be referenced there as herein).

As shown in FIG. 3, the widths $W_{59}$, $W_{61}$ of the wing rolls 59, 61 do not vary (i.e., are substantially the same) from the front end 51 of the system 41 to the back end 55 of the system 41. The widths $W_{63}$ of the center rolls 63 is also substantially the same from the front end 51 of the system 41 to the back end 55 of the system 41.

As shown in FIG. 4, the axes of rotation F, G of the first and second wing rolls 59, 61 are offset (relative to the central axis B) from the axis of rotation H of the center roll 63 (i.e., the first and second wing rolls 59, 61 are forward of the center roll 63). By offsetting the wing rolls 59, 61 from the center roll 63, the wing rolls 59, 61 may overlap relative to their widths $W_{59}$, $W_{61}$, $W_{63}$ (FIG. 7) (i.e., the first and second wing rolls 59, 61 of each idler 45 overlap the center roll 63 relative to their widths).

A frame 75 (FIG. 4) supports the first wing roll 59, second wing roll 61 and center roll 63. The frame 75 includes a wing roll crossing member 79 that supports the first and second wing rolls 59, 61. The frame 75 also includes a center roll crossing member 81 that supports the center roll 63. Both the wing roll crossing member 79 and the center roll crossing member 81 are orthogonal to the central axis B and are parallel to the horizontal plane D of the idler 45. The wing roll crossing member 79 and center roll crossing member 81 are attached to rails (not shown) at their ends. The rails are part of the conveyor belt system framework and extend over the length of the conveyer belt system 3 (FIG. 1).

A first outer bracket 83 connects wing roll crossing member 79 to the first wing roll 59 at its outer end 65 and a first inner bracket 85 connects the crossing member 79 to the first wing roll 59 at its inner end 67. Similarly, a second outer bracket 89 and second inner bracket 91 connect the second wing roll 61 to the wing roll crossing member 79. First and second center roll brackets 95, 97 connect the center roll crossing member 81 to the center roll 63 at its first and second ends 101, 103. Clips 98, 99, 100 (FIG. 4) may be used to secure the rolls 59, 61, 63 to the brackets 83, 85, 89, 91, 95, 97.

The first and second outer brackets 83, 89 (FIG. 4) and first and second inner brackets 85, 91 that support the wing rolls 59, 61 are secured to the crossing member 79 by fasteners 82. Upon loosening and/or removal of fasteners 82, the first and second outer brackets 83 (FIG. 4) and first and second inner brackets 85, 91 are capable of sliding along the wing roll crossing member 79 (i.e., the wing rolls 59, 61 are retractable with respect to the frame 75). This arrangement allows the rolls 59, 61 to be replaced upon damage or wear of the rolls 59, 61. Similarly, the center roll 63 is secured to the center roll cross-member 81 by fasteners and the center roll 63 and first and second brackets 95, 97 are capable of sliding relative to the cross-member 81.

Figure 5:
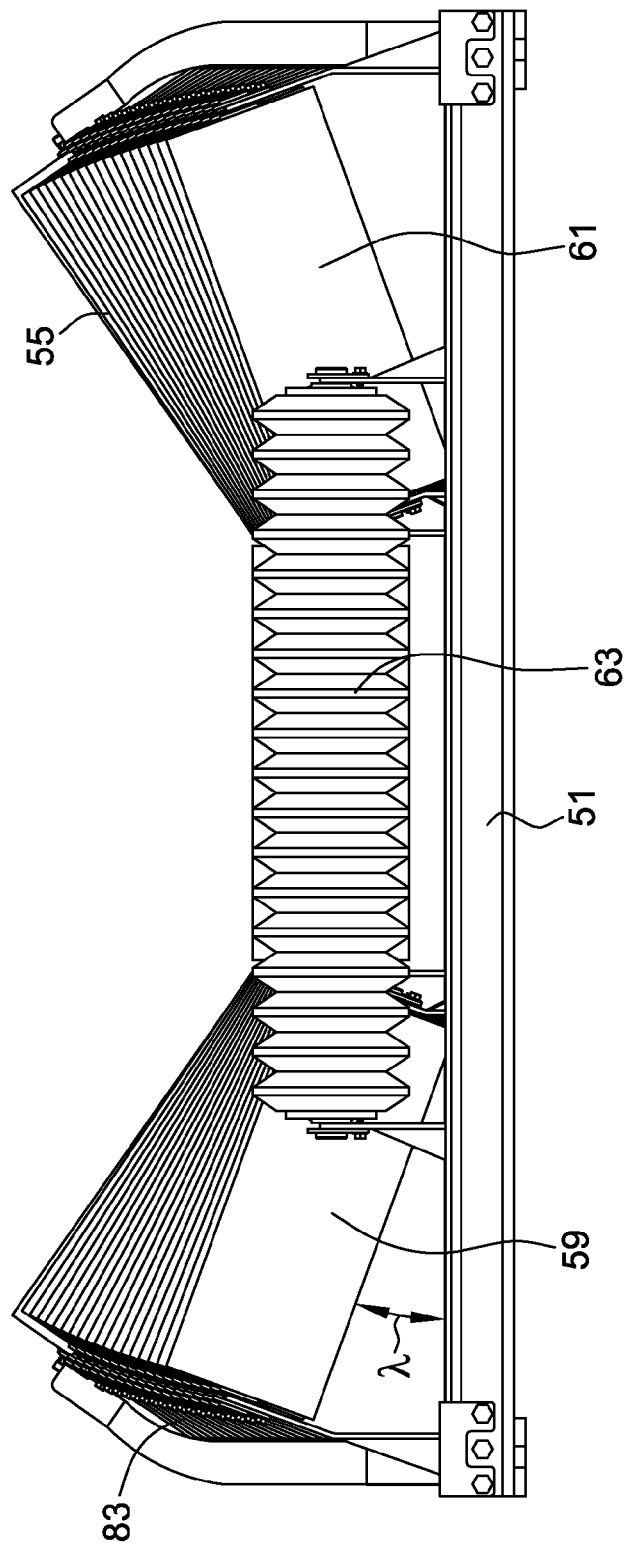
FIG. 5 is a front view of the transition idler system and a troughing idler.
Figure 6:
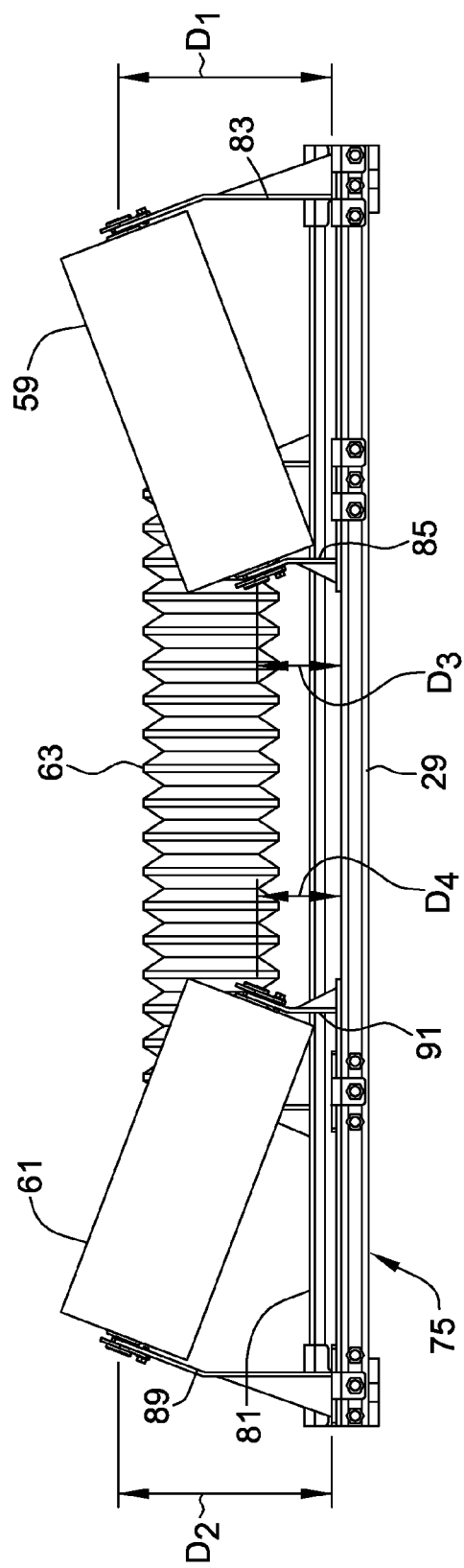
FIG. 6 is a rear view of a transition idler.

As shown in FIG. 5, the idler system 41 increases the trough angle of the belt from its front end 51 to its back end 55 by incrementally increasing the trough angle of the first and second wing rolls 59, 61. The trough angle is increased by increasing the respective distances $D_1$, $D_2$ (FIG. 6) between the frame 75 and each connection between the wing roll 59, 61 and first and second outer brackets 83, 89 from the front end 51 (FIG. 4) to the back end 55 of the system.

The distances $D_1$, $D_2$ between the frame 75 and the connection between the first and second wing rolls 59, 61 and first and second outer brackets 83, 89 may be increased by increasing the lengths of each of the outer brackets 83, 89 (FIG. 8) from the front end 51 to the back end 55 of the system. As referred herein and as shown in FIG. 9, the "length" $L_{83}$ of the outer brackets 83 is the vertical distance between the point at which the bracket 83 is attached to the wing roll crossing member 79 of the frame and the bottom of a outer bracket slot 108 at which the bracket 83 is attached to the wing roll.

Figure 8:
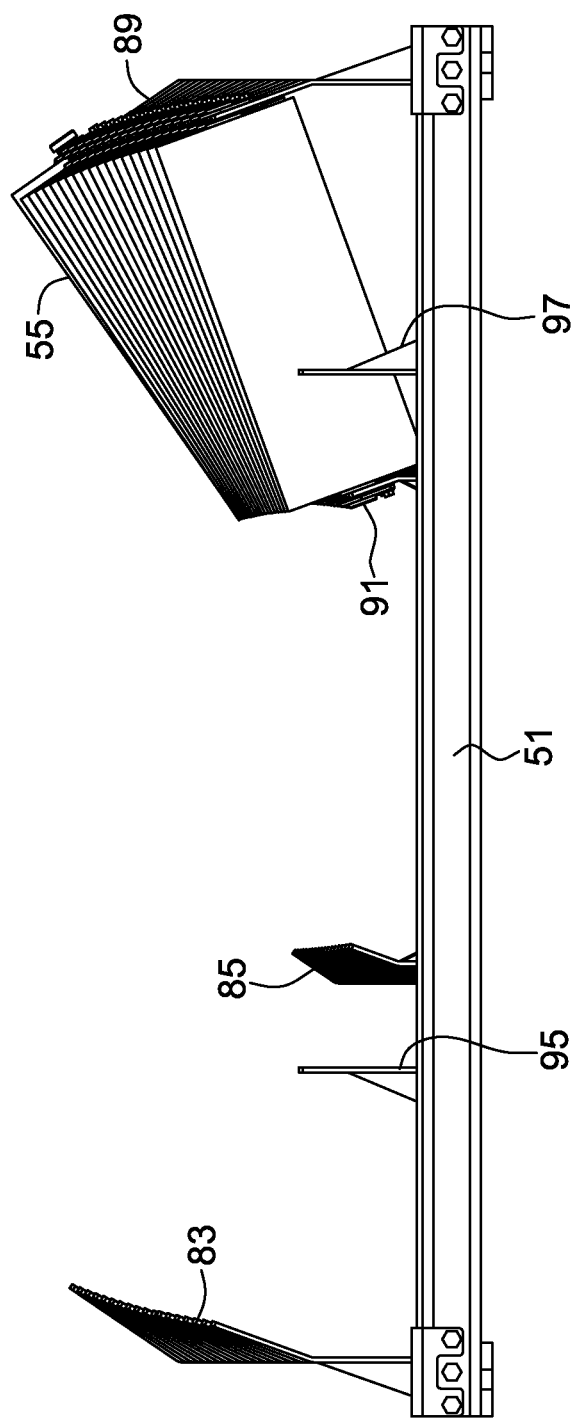
FIG. 8 is front view of the transition idler system without the center rolls and one set of wing rolls not being shown.
Figure 9:
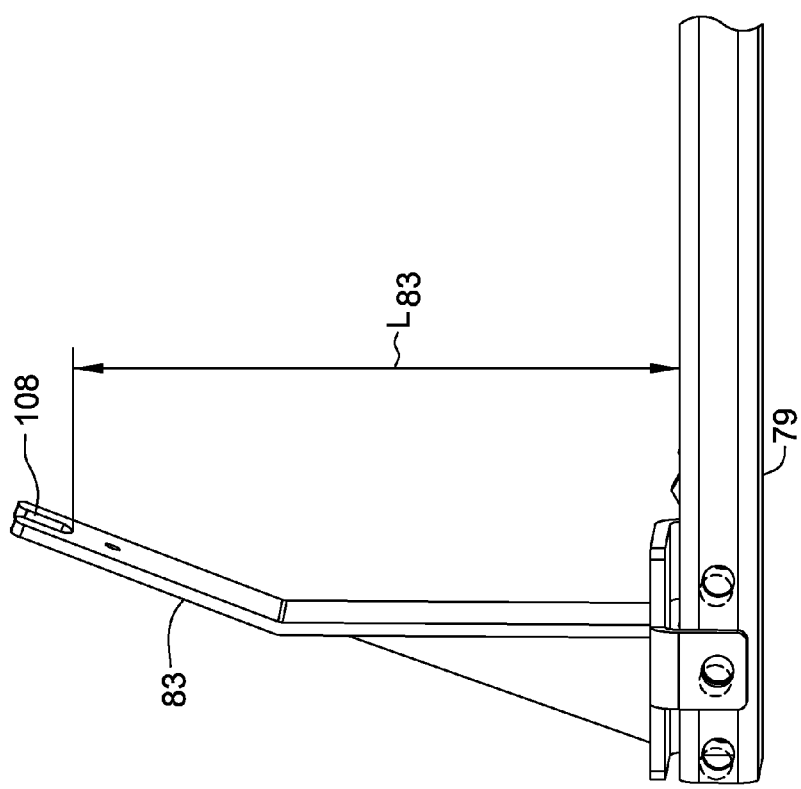
FIG. 9 is a perspective view of an idler frame and an outer bracket for supporting a wing roll.

As may be seen in FIG. 8, in addition to moving upward, the point of attachment between the outer bracket 83, 89 and the respective wing roll 59, 61 also moves inward (i.e., toward the central axis B (FIG. 4)) from the front end 51 to the back end 55 of the idler system 41 to accommodate the increasing trough angles.

Figure 10:
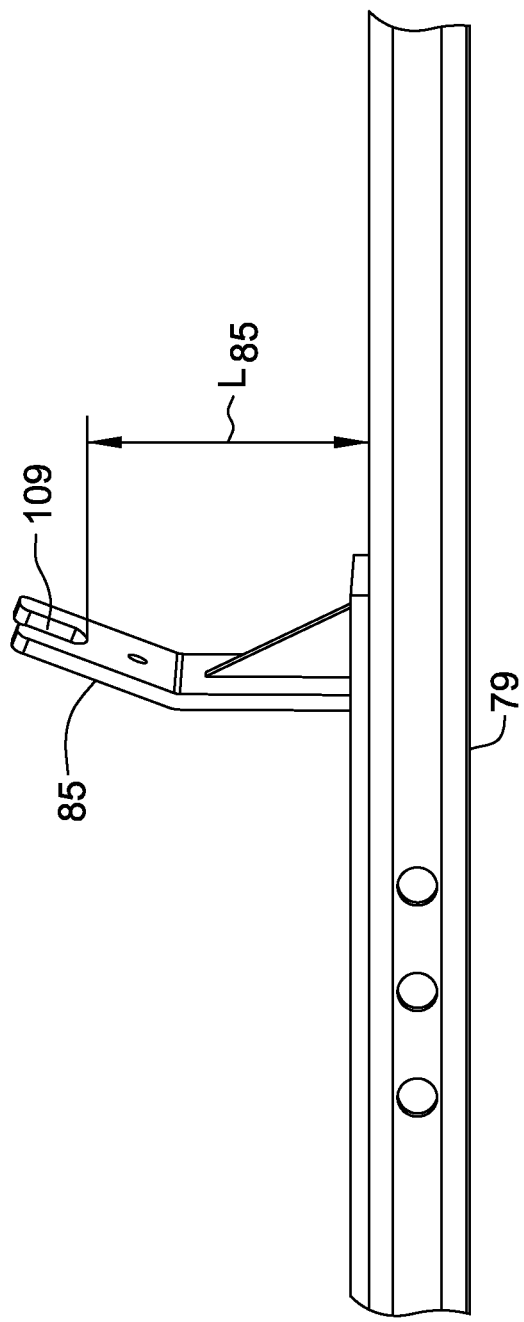
FIG. 10 is a perspective view of an idler frame and an inner bracket for supporting a wing roll.

The respective distances $D_3$, $D_4$ (FIG. 6) between the frame 75 and the connection between the first and second inner brackets 85, 91 and the center rolls 59, 61 also increase from the front end 51 to the back end 55 of the system 41. These distances are increased by increasing the length of the inner brackets 85, 91 from the front end 51 to the back end 55 of the system 41. As referenced herein and as shown in FIG. 10, the "length" $L_{85}$ of the brackets 85, 91 is the difference in the vertical distance between the point the bracket 85 is attached to the wing roll crossing member 79 of the frame and the bottom of an inner bracket slot 109 at which the bracket 85 is attached to the wing roll.

In some embodiments, the outer brackets 83, 89 and/or inner brackets 85, 91 are adjustable in length. In such embodiments, the length of the bracket as referenced herein is the length as assembled in a conveying state (i.e., the vertical difference between the frame and the point at which the bracket attaches to the wing roll, typically the bottom of a slot in the adjustable bracket, during conveying operations,).

Generally, the incremental change in the length of the outer brackets 83, 89 (and distances $D_1$ and $D_2$) between adjacent idlers is greater than the incremental change in the length of the corresponding inner brackets 85, 91 (and distances $D_3$ and $D_4$) between adjacent idlers. In this arrangement the trough angle of the wing rolls 59, 61 may be increased. For example, the trough angle (i.e., the angle formed between the first and second wing roll 59, 61 and the horizontal plane D (FIG. 4)) may increase at least about 5°, at least about 15°, at least about 20° or more from the first idler 45i (FIG. 3) to the terminal idler 45t.

In some embodiments, the trough angle of the first idler 45i is from about 1° to about 25° (e.g., from about 10° to about 25°) and the toughing angle of the terminal idler 45t is from about 30° to about 50° (e.g., about 35° or even about 45°). Each idler may increase the trough angle at least about 0.25° relative to the proceeding idler or at least about 0.50°, at least about 0.75°, at least about 3°, at least about 7.5° or even at least about 10° relative to the proceeding idler. In this regard, the increase in the trough angle between adjacent idlers may be less than 10° or, as in other embodiments, less than about 5°, less than about 2.5° or less than about a 1° increase relative to the proceeding idler (e.g., from about 0.25° to about 10°, from 0.25° to about 5° or from 0.25° to 1°).

Figure 11:
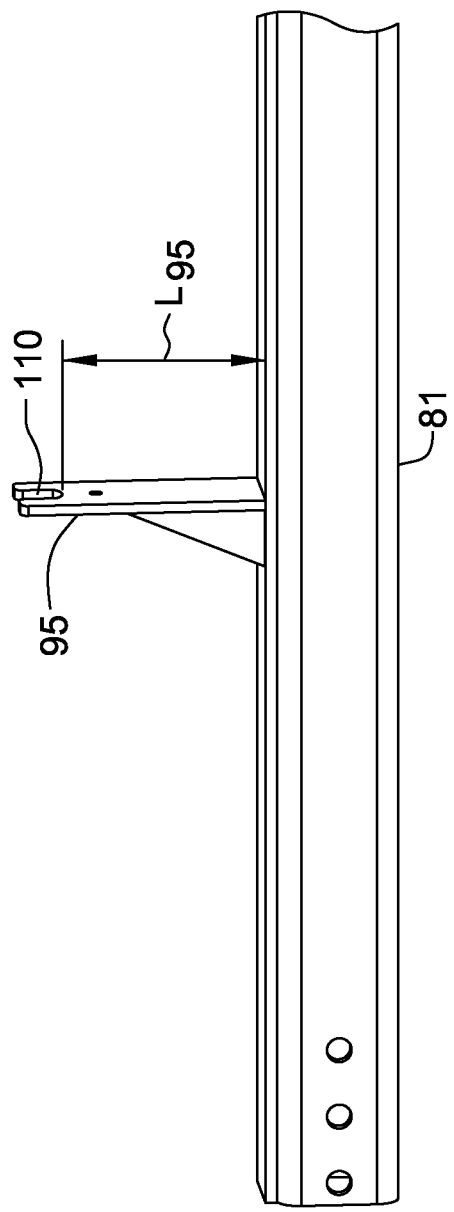
FIG. 11 is a perspective view of an idler frame and a bracket for supporting a center roll.

The center roll brackets 95, 97 also have a length. As shown in FIG. 8, the length of the center roll brackets 95, 97 is substantially the same from the front end 51 of the system to the back end 55. As used herein and with reference to FIG. 11, the "length" of the center roll bracket 95 is the vertical distance between the point at which the bracket 95 is attached to the center roll cross-member 81 and the bottom of a center roll bracket slot 110 at which the bracket 95 is attached to the center roll.

The first and second outer brackets 83, 89 that secure the first and second wing rolls 59, 61; the first and second inner brackets 85, 91 that secure the first and second wing rolls 59, 61; and the first and second center roll brackets 95, 97 of each idler 45 are generally attached to the frame 75 at the same position relative to the axis of rotation H (FIG. 4) of the center roll 63 from the front end 51 (FIG. 3) to the back end 55 of the system 41.

Figure 12:
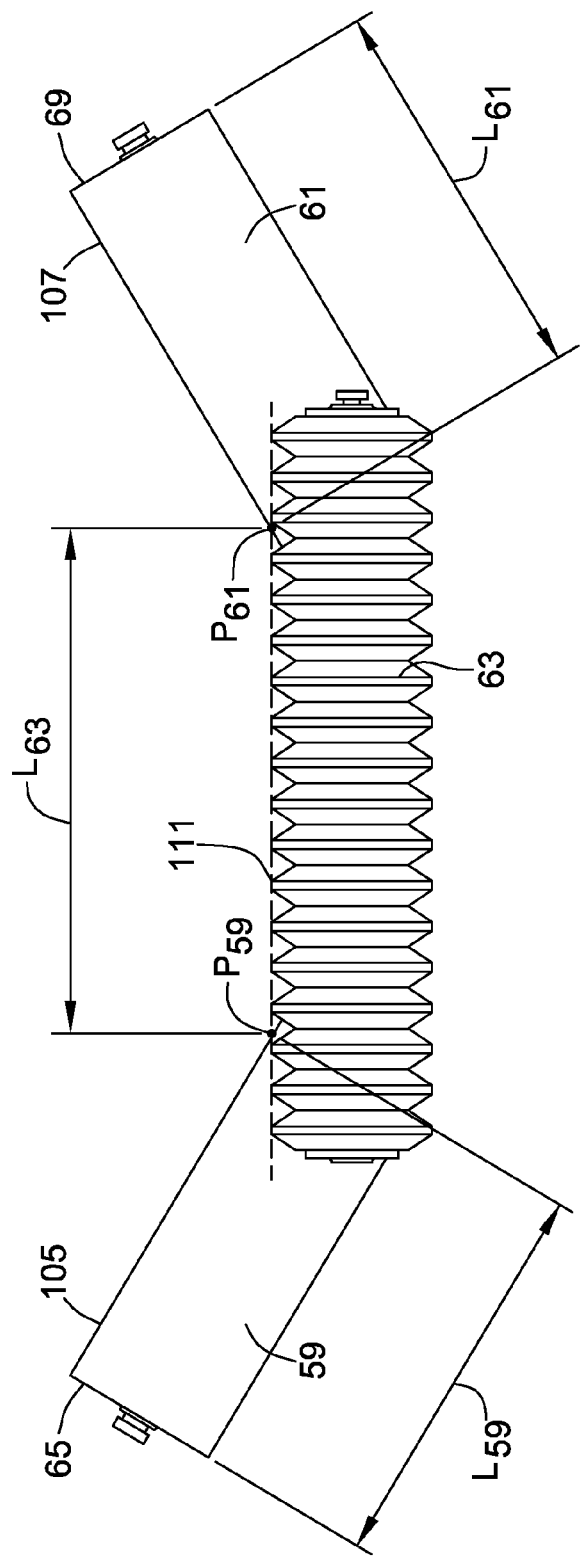
FIG. 12 is a front view of the wing rolls and the center roll of the transition idler of FIG. 4.

By offsetting the wing rolls 59, 61 from the center roll 63 (FIG. 4) and increasing the trough angle from the front end 51 (FIG. 3) to the back end 55 of the idler system 41, the idler system transitions the conveyor belt profile from a picking idler-configuration in which the center roll 63 has a length greater than the wing rolls 59, 61 to a troughing idler-configuration (idlers 25 of FIG. 1) in which the center roll and wing rolls have substantially the same width. As shown in FIG. 12, the first and second wing rolls 59, 61 have upper surfaces 105, 107 that pass below the upper surface 111 of the center roll 63 (the upper surface 111 being planar with the outermost surface of roll 63 for rolls that undulate such as rubber disk rolls) at a first vertical intersection point $P_{59}$ and a second vertical intersection point $P_{61}$. The portion of the upper surface 111 of the center roll 63 between the intersection points $P_{59}$, $P_{61}$ contacts the belt and may be referred to as the "belt-engaging surface" of the center roll 63.

The first wing roll 59 has a belt-engaging surface that extends from the first vertical intersection point $P_{59}$ to the outer end 65 of the roll 59. The second wing roll 61 has a belt-engaging surface that extends from the second vertical intersection point $P_{61}$ to the outer end 69 of the second roll 61. Each of the belt engaging surfaces of the first and second rolls 59, 61 and the center roll 63 has a width $L_{59}$, $L_{61}$, $L_{63}$ (FIG. 12). As shown in FIG. 5, the widths of the belt-engaging surfaces $L_{63}$ of the center roll 63 decrease from the front end 51 of the system to the back end 55 of the system. The widths $L_{59}$, $L_{61}$ of the belt-engaging surfaces of the first and second wing rolls 59, 61 increase from the front end 51 of the system to the back end 55 of the system. In this manner, the system 41 transitions from a picking idler-configuration to a troughing idler-configuration.

As shown in FIG. 1, a troughing idler 25 (i.e., an idler having substantially equal width first 33 and second rolls 35 and center rolls 37 (FIG. 2)) is positioned adjacent the transition idler system 41. In some embodiments, the system 41 includes the troughing idler 25.

While the transition idler system 41 has generally been described with reference to the tail section 5 (FIG. 3) of the conveyor system 3, the idler system 41 may be used in other portions of the system 3 to change the profile of the conveyor belt. Further, while the idler system 41 is shown and described as increasing the trough angle of the conveyor belt 11 from its front end 51 to its back end 55, the system 41 may be reversed to decrease the trough angle such as at the head end 6 of the system 3.

The conveyor system 3 of FIG. 1 described above may be used in various methods for transporting bulk material. According to several embodiments, bulk material is loaded onto the outer surface 19 of the conveyor belt 11 at the tail section 5. The tail pulley 13 and head pulley 15 are rotated to cause the conveyor belt 11 to rotate and to cause bulk material to travel from the tail section 5 to the head section 6 of the conveyor system 3. Bulk material is discharged from the conveyor belt at the head section 6. In this regard, it should be understood that the term "rotate" as used herein does not imply that that the respective pulley that is rotated is a drive pulley. Rather, rotation may be caused by movement of the conveyor belt 11 which may be driven by any other of the pulleys used in the conveyor system and the term "rotate" should not be considered in a limiting sense.

Compared to conventional idler systems, the transition idler system 41 of embodiments described herein has several advantages. By including picking idlers 45 (FIG. 4) which include a center idler roll 63 with a width greater than that of the wing roll idlers 59, 61, the stress on the belt is reduced which allows the transition from a flat belt profile to a troughing idler profile to occur over a shorter distance. By offsetting and overlapping the wing rolls 59, 61 from the center roll 63 and by using outer brackets 83, 85 that increase in length from the front end 51 to the back end 55 of the idler system 41, the belt-contacting surfaces of the wing rolls 59, 61 may increase and the belt contacting surface of the center rolls 63 may decrease from the front end 51 to the back end 55 of the system 41. In this arrangement, the system 41 may transition from a picking idler-configuration to a troughing idler-configuration without varying the size of the center rolls 63 and the wing rolls 59, 61 which allows the rolls of the idlers 45 to be interchangeable and reduces the inventory of rolls. Use of roll brackets 83, 85, 89, 91, 95, 97 (FIG. 4) that slide relative to the frame cross-members 79, 81 (i.e., that are retractable) allows the rolls 59, 61, 63 to be replaced after wear or damage without removing the entire idler from the system.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. An idler system for increasing the trough angle of a conveyor belt, the idler system comprising:
at least three conveyor belt idlers for supporting the conveyor belt, the system having a front end and a back end and a central axis that extends through the conveyor belt idlers from the front end to the back end, each conveyor belt idler comprising:
a first wing roll having an outer end and an inner end;
a second wing roll having an outer end and an inner end;
a center roll between the first wing roll and the second wing roll, the first wing roll and second wing roll being angled downward toward the center roll, the first and second wing rolls and center roll each having an axis of rotation, the axis of rotation of the first and second wing rolls being offset from the axis of rotation of the center roll along the central axis;
a frame for supporting the first wing roll, second wing roll and center roll;
a first outer bracket connected to the frame and to the first wing roll at its outer end, there being a vertical distance from the frame to the connection between the first wing roll and the first outer bracket;
a second outer bracket connected to the frame and the second wing roll at its outer end, there being a vertical distance from the frame to the connection between the second wing roll and the second outer bracket, wherein the vertical distance from the frame to the connection between the first wing roll and the first outer bracket and the vertical distance from the frame to the connection between the second wing roll and the second outer bracket increases from the front end of the system to the back end of the system;
wherein the first and second wing rolls and center roll of each idler each have an upper surface, the first and second wing rolls angling downward toward the center roll such that a portion of the upper surfaces of the first and second rolls pass below the upper surface of the center roll at a first and second vertical intersection point, the portion of the upper surface of the center roll between the first and second intersection points being a belt-engaging surface having a width, the width of the belt-engaging surfaces of the center rolls decreasing from the front end of the system to the back end of the system.

2. The idler system as set forth in claim 1 wherein, for each idler, the center roll and the first and second wing rolls each have a width, the width of the center roll being greater than the width of the first and second wing rolls.

3. The idler system as set forth in claim 1 wherein, for each idler, the center roll and the first and second wing rolls each have a width, the first and second wing rolls overlapping the center roll relative to their width.

4. The idler system as set forth in claim 1 wherein the first and second wing rolls and center rolls each have a width, the width of each of the first and second wing rolls being substantially the same from the front end of the system to the back end of the system and the width of the center rolls being substantially the same from the front end of the system to the back end of the system.

5. The idler system as set forth in claim 1 wherein the first outer bracket has a length and the second outer bracket has a length, wherein the lengths of the outer brackets of the first and second wing rolls increase from the front end of the system to the back end of the system, the lengths of the first and second outer brackets being a vertical distance between a point the bracket is attached to the frame and a bottom of a slot at which the bracket is attached to the wing roll.

6. The idler system as set forth in claim 5 wherein the length of the first and second outer brackets is adjustable.

7. The idler system as set forth in claim 1 wherein each idler comprises:
   a first inner bracket connected to the frame and the first wing roll at its inner end, the first inner bracket having a length; and
   a second inner bracket connected to the frame and the second wing roll at its inner end, the second inner bracket having a length, wherein the lengths of the inner brackets of the first and second wing rolls increase from the front end of the system to the back end of the system.

8. The idler system as set forth in claim 1 further comprising a troughing idler at the back end of the system, the troughing idler comprising:
   a first wing roll;
   a second wing roll; and
   a center roll between the first wing roll and the second wing roll, the first and second wing rolls and center roll each having a width, the width of the first wing roll, second wing roll and center roll being substantially the same.

9. The idler system as set forth in claim 1 comprising at least about 5 idlers from the front end to the back end of the system.

10. The idler system as set forth in claim 1 wherein each idler comprises no more than three rolls, the three rolls being the first and second wing rolls and the center roll.

11. The idler system as set forth in claim 1 wherein the center roll of each idler is segmented into two or more sectional rolls.

12. The idler system as set forth in claim 1 having a horizontal plane that extends through the system and a first idler at the front of the system and a terminal idler at the rear of the system, the axes of rotation of the first wing rolls and the second wing rolls of each idler forming an angle with the horizontal plane, the angle between the first and second wing rolls of the first idler and the horizontal plane being from about 1° to about 25° and the angle between the first and second wing rolls of the terminal idler and the horizontal plane being from about 30° to about 50°.

13. The idler system as set forth in claim 1 having a horizontal plane that extends through the system and a first idler at the front of the system and a terminal idler at the rear of the system, the axes of rotation of the first wing rolls and the second wing rolls of each idler forming an angle with the horizontal plane, the angles increasing from the front end to the back end, the increase in the angle being less than about 10° from the proceeding idler.

14. A belt conveyor system for transporting bulk materials, the system comprising:
   a conveyor belt;
   a tail section at which bulk material is loaded onto the conveyor belt, the tail section including a tail pulley around which the conveyer belt is looped;
   a head section at which bulk material is discharged from the conveyor belt, the head section including a head pulley around which the conveyor belt is looped; and
   the idler system as set forth in claim 1 between the tail pulley and the head pulley, the conveyor belt being supported by the idlers, the idler system being a transition idler system; and
   a system of troughing idlers for carrying the conveyor belt and bulk material from the tail section to the head section, the troughing idlers having a first wing roll, a second wing roll, and a center roll between the first wing roll and the second wing roll, the first and second wing rolls and center roll each having a width, the width of the first wing roll, second wing roll and center roll being substantially the same, the system of troughing idlers being between the transition idler system and the head pulley.

15. An idler system for increasing the trough angle of a conveyor belt, the idler system comprising:
   at least three conveyor belt idlers for supporting the conveyor belt, the system having a front end and a back end and a central axis that extends through the conveyor belt idlers from the front end to the back end, each conveyor belt idler comprising:
      a first wing roll having an outer end and an inner end;
      a second wing roll having an outer end and an inner end;
      a center roll between the first wing roll and the second wing roll, the first wing roll and second wing roll being angled downward toward the center roll, the first and second wing rolls and center roll each having an axis of rotation, the axis of rotation of the first and second wing rolls being offset from the axis of rotation of the center roll along the central axis;
      a frame for supporting the first wing roll, second wing roll and center roll;
      a first outer bracket connected to the frame and to the first wing roll at its outer end, there being a vertical distance from the frame to the connection between the first wing roll and the first outer bracket;
      a second outer bracket connected to the frame and the second wing roll at its outer end, there being a vertical distance from the frame to the connection between the second wing roll and the second outer bracket, wherein the vertical distance from the frame to the connection between the first wing roll and the first outer bracket and the vertical distance from the frame to the connection between the second wing roll and the second outer bracket increases from the front end of the system to the back end of the system;
   wherein the first and second wing rolls and center roll of each idler each have an upper surface, the first and second wing rolls angling downward toward the center roll such that a portion of the upper surfaces of the first and second rolls pass below the upper surface of the center roll at a first and second vertical intersection point, the portion of the upper surfaces of the first and second wing rolls between the outer end of the roll and the vertical intersection point being belt-engaging surfaces having a width, the width of the belt-engaging surfaces of the first and second wing rolls increasing from the front end of the system to the back end of the system.

16. The idler system as set forth in claim 15 wherein, for each idler, the center roll and the first and second wing rolls each have a width, the width of the center roll being greater than the width of the first and second wing rolls.

17. The idler system as set forth in claim 15 wherein, for each idler, the center roll and the first and second wing rolls each have a width, the first and second wing rolls overlapping the center roll relative to their width.

18. The idler system as set forth in claim 15 wherein the first outer bracket has a length and the second outer bracket has a length, wherein the lengths of the outer brackets of the first and second wing rolls increase from the front end of the system to the back end of the system, the lengths of the first and second outer brackets being a vertical distance between a point the bracket is attached to the frame and a bottom of a slot at which the bracket is attached to the wing roll.

19. The idler system as set forth in claim 18 wherein the length of the first and second outer brackets is adjustable.

20. The idler system as set forth in claim 15 wherein each idler comprises:
 a first inner bracket connected to the frame and the first wing roll at its inner end, the first inner bracket having a length; and
 a second inner bracket connected to the frame and the second wing roll at its inner end, the second inner bracket having a length, wherein the lengths of the inner brackets of the first and second wing rolls increase from the front end of the system to the back end of the system.

21. The idler system as set forth in claim 15 comprising at least about 5 idlers from the front end to the back end of the system.

22. An idler system for increasing the trough angle of a conveyor belt, the idler system comprising:
 at least three conveyor belt idlers for supporting the conveyor belt, the system having a front end and a back end and a central axis that extends through the conveyor belt idlers from the front end to the back end, each conveyor belt idler comprising:
  a first wing roll having an outer end and an inner end;
  a second wing roll having an outer end and an inner end;
  a center roll between the first wing roll and the second wing roll, the first wing roll and second wing roll being angled downward toward the center roll, the first and second wing rolls and center roll each having an axis of rotation, the axis of rotation of the first and second wing rolls being offset from the axis of rotation of the center roll along the central axis;
 a frame for supporting the first wing roll, second wing roll and center roll, the frame comprising:
  a wing roll crossing member orthogonal to the central axis, the first and second outer brackets being attached to the wing roll crossing member, the first and second outer brackets being capable of sliding along the wing roll crossing member to replace a wing roll;
  a center roll crossing member orthogonal to the central axis, the center roll being connected to the center roll crossing member by two center roll brackets, the two center roll brackets being capable of sliding along the center roll crossing member to replace the wing roll;
 a first outer bracket connected to the frame and to the first wing roll at its outer end, there being a vertical distance from the frame to the connection between the first wing roll and the first outer bracket;
 a second outer bracket connected to the frame and the second wing roll at its outer end, there being a vertical distance from the frame to the connection between the second wing roll and the second outer bracket, wherein the vertical distance from the frame to the connection between the first wing roll and the first outer bracket and the vertical distance from the frame to the connection between the second wing roll and the second outer bracket increases from the front end of the system to the back end of the system.

23. The idler system as set forth in claim 22 comprising at least about 5 idlers from the front end to the back end of the system.

* * * * *